(12) United States Patent
Iizumi et al.

(10) Patent No.: US 11,467,354 B2
(45) Date of Patent: Oct. 11, 2022

(54) ULTRA-SMALL FORM FACTOR RECEPTACLE FOR RECEIVING A FIBER OPTIC CONNECTOR OPPOSING A FERRULE ASSEMBLY

(71) Applicant: Senko Advanced Components Inc, Marlborough, MA (US)

(72) Inventors: Kenji Iizumi, Tokyo (JP); Kazuyoshi Takano, Tokyo (JP); Jimmy Jun-Fu Chang, Worcester, MA (US); Takuya Ninomiya, Natick, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 16/936,726

(22) Filed: Jul. 23, 2020

(65) Prior Publication Data
US 2021/0026083 A1    Jan. 28, 2021

Related U.S. Application Data

(60) Provisional application No. 62/878,133, filed on Jul. 24, 2019, provisional application No. 62/877,708, filed on Jul. 23, 2019.

(51) Int. Cl.
*G02B 6/38* (2006.01)
(52) U.S. Cl.
CPC ......... *G02B 6/3879* (2013.01); *G02B 6/3821* (2013.01); *G02B 6/3825* (2013.01); *G02B 6/3885* (2013.01); *G02B 6/3893* (2013.01)
(58) Field of Classification Search
CPC ...... G02B 6/38; G02B 6/3821; G02B 6/3825; G02B 6/3885; G02B 6/3893

USPC .......................................................... 385/78
See application file for complete search history.

(56) References Cited

U.S. PATENT DOCUMENTS

| | | |
|---|---|---|
| 3,721,945 A | 3/1973 | Hulls |
| 4,150,790 A | 4/1979 | Potter |
| 4,327,964 A | 5/1982 | Haesley et al. |
| 4,478,473 A | 10/1984 | Frear |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| 4,979,792 A | 12/1990 | Weber |
| 5,026,138 A | 6/1991 | Boudreau |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

International Search Report and Written Opinion; Application No. PCT/US2018/042202, dated Dec. 7, 2018, pp. 17.

(Continued)

*Primary Examiner* — Kaveh C Kianni

(57) ABSTRACT

A receptacle for receiving and securing one or more fiber optical connectors and ferrule assembly opposing each other in a secured position deploying an interconnect assembly. A first side of the interconnect assembly has one or more sets of opposing hooks at a first end to accept and secure a connector or ferrule assembly. A second end of the interconnect assembly receives a ferrule assembly secured with a stopper.

7 Claims, 10 Drawing Sheets

(56) References Cited

U.S. PATENT DOCUMENTS

| | | |
|---|---|---|
| 5,031,981 A | 7/1991 | Peterson |
| 5,011,025 A | 8/1991 | Haitmanek |
| 5,073,045 A | 12/1991 | Abendschein |
| D323,143 S | 1/1992 | Ohkura et al. |
| 5,146,813 A | 9/1992 | Stanfill, Jr. |
| 5,212,752 A | 5/1993 | Stephenson et al. |
| 5,265,181 A | 11/1993 | Chang |
| 5,289,554 A | 2/1994 | Cubukciyan et al. |
| 5,317,663 A | 5/1994 | Beard et al. |
| 5,321,784 A | 6/1994 | Cubukciyan et al. |
| 5,335,301 A | 8/1994 | Newman et al. |
| 5,348,487 A | 9/1994 | Marazzi et al. |
| 5,444,806 A | 8/1995 | de Marchi et al. |
| 5,481,634 A | 4/1996 | Anderson et al. |
| 5,506,922 A | 4/1996 | Grois et al. |
| 5,521,997 A | 5/1996 | Rovenolt et al. |
| 5,570,445 A | 10/1996 | Chou et al. |
| 5,588,079 A | 12/1996 | Tanabe et al. |
| 5,602,951 A | 2/1997 | Shiota |
| 5,684,903 A | 11/1997 | Kyomasu et al. |
| 5,687,268 A | 11/1997 | Stephenson et al. |
| 5,774,611 A * | 6/1998 | Nagase ............... G02B 6/3825 385/58 |
| 5,781,681 A | 7/1998 | Manning |
| 5,845,036 A | 12/1998 | De Marchi |
| 5,915,987 A | 6/1999 | Reed |
| 5,937,130 A | 8/1999 | Amberg et al. |
| 5,956,444 A | 9/1999 | Duda et al. |
| 5,971,626 A | 10/1999 | Knodell et al. |
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,250,817 B1 | 6/2001 | Lampert et al. |
| 6,276,840 B1 | 8/2001 | Weiss |
| 6,364,537 B1 | 4/2002 | Maynard |
| 6,379,052 B1 | 4/2002 | de Jong |
| 6,422,759 B1 | 7/2002 | Kevern |
| 6,443,627 B1 | 9/2002 | Anderson et al. |
| 6,461,054 B1 | 10/2002 | Iwase |
| 6,471,412 B1 | 10/2002 | Belenkiy et al. |
| 6,478,472 B1 | 11/2002 | Anderson et al. |
| 6,485,194 B1 | 11/2002 | Shirakawa |
| 6,530,696 B1 | 3/2003 | Ueda |
| 6,551,117 B2 | 4/2003 | Poplawski et al. |
| 6,565,262 B2 | 5/2003 | Childers |
| 6,579,014 B2 | 6/2003 | Melton et al. |
| 6,585,194 B1 | 7/2003 | Brushwood |
| 6,634,796 B2 | 10/2003 | de Jong |
| 6,634,801 B1 | 10/2003 | Waldron et al. |
| 6,648,520 B2 | 11/2003 | McDonald et al. |
| 6,668,113 B2 | 12/2003 | Togami |
| 6,682,228 B2 | 1/2004 | Ralhnam et al. |
| 6,685,362 B2 | 2/2004 | Burkholder et al. |
| 6,695,486 B1 | 2/2004 | Falkenberg |
| 6,811,321 B1 | 11/2004 | Schmalzigaug et al. |
| 6,817,272 B2 | 11/2004 | Holland |
| 6,854,894 B1 | 2/2005 | Yunker et al. |
| 6,869,227 B2 | 3/2005 | Del Grosso |
| 6,872,039 B2 | 3/2005 | Baus et al. |
| 6,935,789 B2 | 8/2005 | Gross, III et al. |
| 7,036,993 B2 | 5/2006 | Luther |
| 7,052,186 B1 | 5/2006 | Bates |
| 7,077,576 B2 | 7/2006 | Luther |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurrer |
| D543,146 S | 5/2007 | Chen et al. |
| 7,258,493 B2 | 8/2007 | Milette |
| 7,264,402 B2 | 9/2007 | Theuerkom |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurrer et al. |
| 7,325,980 B2 | 2/2008 | Pepe |
| 7,329,137 B2 | 2/2008 | Martin et al. |
| 7,354,291 B2 | 4/2008 | Caveney et al. |
| 7,331,718 B2 | 5/2008 | Yazaki et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,473,124 B1 | 1/2009 | Briant |
| 7,510,335 B1 | 3/2009 | Su et al. |
| 7,513,695 B1 | 4/2009 | Lin et al. |
| 7,534,128 B2 | 5/2009 | Caveney et al. |
| 7,540,666 B2 | 6/2009 | Luther |
| 7,561,775 B2 | 7/2009 | Lin et al. |
| 7,588,373 B1 | 9/2009 | Sato |
| 7,591,595 B2 | 9/2009 | Lue et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,712,970 B1 | 5/2010 | Lee |
| 7,824,113 B2 | 11/2010 | Wong et al. |
| 7,837,395 B2 | 11/2010 | Lin et al. |
| D641,708 S | 7/2011 | Tammauchi |
| 8,083,450 B1 | 12/2011 | Smith et al. |
| 8,152,385 B2 | 4/2012 | de Jong |
| 8,186,890 B2 | 5/2012 | Lu |
| 8,192,091 B2 | 6/2012 | Hsu et al. |
| 8,202,009 B2 | 6/2012 | Lin et al. |
| 8,221,007 B2 | 7/2012 | Peterhans |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,534,928 B2 | 9/2013 | Cooke |
| 8,556,645 B2 | 10/2013 | Crain |
| 8,559,781 B2 | 10/2013 | Childers |
| 8,622,634 B2 | 1/2014 | Arnold |
| 8,636,424 B2 | 1/2014 | Kuffel et al. |
| 8,651,749 B2 | 2/2014 | Clovis et al. |
| 8,676,022 B2 | 3/2014 | Jones |
| 8,678,670 B2 | 3/2014 | Takahashi |
| 8,727,638 B2 | 5/2014 | Lee |
| 8,770,863 B2 | 7/2014 | Cooke et al. |
| 8,869,661 B2 | 10/2014 | Opstad |
| 9,052,474 B2 | 6/2015 | Jiang |
| 9,250,402 B2 | 2/2016 | Ishii et al. |
| 9,310,569 B2 | 4/2016 | Lee |
| 9,366,829 B2 | 6/2016 | Czosnowski |
| 9,411,110 B2 | 8/2016 | Barnette, Jr. et al. |
| 9,448,370 B2 | 9/2016 | Xue et al. |
| 9,465,172 B2 | 10/2016 | Shih |
| 9,494,744 B2 | 11/2016 | de Jong |
| 9,548,557 B2 | 1/2017 | Liu |
| 9,551,842 B2 | 1/2017 | Theuerkorn |
| 9,557,495 B2 | 1/2017 | Raven et al. |
| 9,568,686 B2 | 2/2017 | Fewkes et al. |
| 9,581,768 B1 | 2/2017 | Baca et al. |
| 9,599,778 B2 | 3/2017 | Wong et al. |
| 9,658,409 B2 | 5/2017 | Gniadek |
| 9,678,283 B1 | 6/2017 | Chang et al. |
| 9,684,130 B2 | 6/2017 | Veatch et al. |
| 9,684,136 B2 | 6/2017 | Cline et al. |

(56) References Cited

U.S. PATENT DOCUMENTS

| | | |
|---|---|---|
| 9,684,313 B2 | 6/2017 | Chajec |
| 9,709,753 B1 | 8/2017 | Chang et al. |
| 9,778,425 B2 | 10/2017 | Nguyen |
| 9,829,644 B2 | 11/2017 | Nguyen |
| 9,829,645 B2 | 11/2017 | Good |
| 9,869,825 B2 | 1/2018 | Bailey et al. |
| 9,880,361 B2 | 1/2018 | Childers |
| 9,946,035 B2 | 4/2018 | Gustafson |
| 9,971,103 B2 | 5/2018 | de Jong et al. |
| 9,989,711 B2 | 6/2018 | Ott et al. |
| 10,031,296 B2 | 7/2018 | Good |
| 10,107,972 B1 | 10/2018 | Gniadek et al. |
| 10,146,011 B2 | 12/2018 | Nhep |
| 10,281,668 B2 | 5/2019 | Takano et al. |
| 10,281,669 B2 | 5/2019 | Takano et al. |
| 2002/0168148 A1 | 11/2002 | Gilliland |
| 2002/0172467 A1 | 11/2002 | Anderson et al. |
| 2002/0191919 A1 | 12/2002 | Nolan |
| 2003/0053787 A1 | 3/2003 | Lee |
| 2003/0063862 A1 | 4/2003 | Fillion |
| 2003/0157825 A1 | 8/2003 | Kane |
| 2004/0033028 A1* | 2/2004 | Cheng .................. G02B 6/3825 385/55 |
| 2004/0052473 A1 | 3/2004 | Seo |
| 2004/0101253 A1* | 5/2004 | Jong .................... G02B 6/3825 385/78 |
| 2004/0109646 A1 | 6/2004 | Anderson |
| 2004/0161958 A1 | 6/2004 | Togami et al. |
| 2004/0136657 A1 | 7/2004 | Ngo |
| 2004/0141693 A1 | 7/2004 | Szilagvi et al. |
| 2004/0234209 A1 | 11/2004 | Cox et al. |
| 2004/0247252 A1 | 12/2004 | Ehrenreich |
| 2005/0036744 A1 | 2/2005 | Caveney et al. |
| 2005/0111796 A1 | 5/2005 | Matasek et al. |
| 2005/0141817 A1 | 6/2005 | Yazaki et al. |
| 2006/0013539 A1 | 1/2006 | Thaler |
| 2006/0018604 A1 | 1/2006 | Bareel et al. |
| 2006/0089049 A1 | 4/2006 | Sedor |
| 2006/0093274 A1 | 5/2006 | Kahle et al. |
| 2006/0127025 A1 | 6/2006 | Haberman |
| 2006/0160429 A1 | 7/2006 | Dawiedczyk et al. |
| 2006/0269194 A1 | 11/2006 | Luther et al. |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 6/2007 | Shimoji et al. |
| 2007/0149028 A1* | 6/2007 | Yu ....................... G02B 6/4292 439/352 |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0056647 A1 | 3/2008 | Margolin et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0028507 A1 | 1/2009 | Jones et al. |
| 2009/0222457 A1 | 1/2009 | de Jong et al. |
| 2009/0047818 A1 | 2/2009 | Irwin et al. |
| 2009/0092360 A1 | 4/2009 | Lin et al. |
| 2009/0176401 A1 | 7/2009 | Gu |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2009/0220200 A1 | 9/2009 | Wong et al. |
| 2009/0290839 A1 | 11/2009 | En Lin |
| 2009/0290938 A1 | 11/2009 | Asaoka |
| 2010/0034502 A1 | 2/2010 | Lu et al. |
| 2010/0054668 A1 | 3/2010 | Nelson |
| 2010/0092136 A1 | 4/2010 | Nhep |
| 2010/0220961 A1 | 9/2010 | de Jong et al. |
| 2010/0247041 A1 | 9/2010 | Szilagyi |
| 2010/0284656 A1 | 11/2010 | Morra |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0155810 A1 | 6/2011 | Taniguichi |
| 2011/0177710 A1 | 7/2011 | Tobey |
| 2011/0239220 A1 | 9/2011 | Gibson |
| 2012/0099822 A1 | 4/2012 | Kuffel et al. |
| 2012/0155810 A1 | 6/2012 | Nakagawa |
| 2012/0189260 A1 | 7/2012 | Kowalczyk et al. |
| 2012/0237177 A1 | 9/2012 | Minota |
| 2012/0269485 A1 | 10/2012 | Haley et al. |
| 2012/0301080 A1 | 11/2012 | Gniadek |
| 2013/0019423 A1 | 1/2013 | Srutkowski |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0170797 A1 | 7/2013 | Ott |
| 2013/0183012 A1 | 7/2013 | Lopez et al. |
| 2013/0216185 A1 | 8/2013 | Klavuhn |
| 2013/0259429 A1 | 10/2013 | Czosnowski et al. |
| 2013/0308915 A1 | 11/2013 | Buff |
| 2013/0322825 A1 | 12/2013 | Cooke et al. |
| 2014/0016901 A1 | 1/2014 | Lamboum et al. |
| 2014/0023322 A1 | 1/2014 | Gniadek |
| 2014/0050446 A1 | 2/2014 | Chang |
| 2014/0056562 A1 | 2/2014 | Limbert |
| 2014/0133808 A1 | 5/2014 | Hill et al. |
| 2014/0147082 A1 | 5/2014 | Lee |
| 2014/0169727 A1 | 6/2014 | Veatch et al. |
| 2014/0219621 A1 | 8/2014 | Barnette, Jr. et al. |
| 2014/0226946 A1 | 8/2014 | Cooke et al. |
| 2014/0241644 A1 | 8/2014 | Kang |
| 2014/0241678 A1 | 8/2014 | Bringuier et al. |
| 2014/0241688 A1 | 8/2014 | Isenhour et al. |
| 2014/0241689 A1 | 8/2014 | Bradley et al. |
| 2014/0334780 A1 | 11/2014 | Nguyen et al. |
| 2014/0348477 A1 | 11/2014 | Chang |
| 2015/0003788 A1 | 1/2015 | Chen |
| 2015/0111417 A1 | 4/2015 | Vanderwoud |
| 2015/0212282 A1 | 7/2015 | Lin |
| 2015/0241644 A1 | 8/2015 | Lee |
| 2015/0301294 A1 | 10/2015 | Chang et al. |
| 2015/0331201 A1 | 11/2015 | Takano et al. |
| 2015/0355417 A1* | 12/2015 | Takano ................ G02B 6/3821 385/60 |
| 2015/0370021 A1 | 12/2015 | Chan |
| 2015/0378113 A1 | 12/2015 | Good et al. |
| 2016/0131849 A1 | 5/2016 | Takano et al. |
| 2016/0139343 A1 | 5/2016 | Dean, Jr. et al. |
| 2016/0161681 A1 | 6/2016 | Banal, Jr. et al. |
| 2016/0195682 A1 | 6/2016 | Takano |
| 2016/0291262 A1 | 6/2016 | Chang et al. |
| 2016/0231512 A1 | 8/2016 | Seki |
| 2016/0259135 A1 | 9/2016 | Gniadek et al. |
| 2016/0266326 A1 | 9/2016 | Gniadek |
| 2016/0306122 A1 | 10/2016 | Tong et al. |
| 2016/0349458 A1 | 12/2016 | Murray |
| 2016/0370545 A1 | 12/2016 | Jiang |
| 2017/0003458 A1 | 1/2017 | Gniadek |
| 2017/0205587 A1 | 7/2017 | Chang et al. |
| 2017/0205591 A1 | 7/2017 | Takano et al. |
| 2017/0254961 A1 | 9/2017 | Kamada et al. |
| 2017/0276275 A1 | 9/2017 | Beemer et al. |
| 2017/0277059 A1 | 9/2017 | Miura et al. |
| 2017/0343740 A1 | 11/2017 | Nguyen |
| 2018/0143384 A1 | 5/2018 | Tong et al. |
| 2018/0156988 A1 | 6/2018 | Gniadek |
| 2018/0172923 A1 | 6/2018 | Bauco |
| 2018/0259717 A1* | 9/2018 | Takano ................ G02B 6/3893 |
| 2018/0356600 A1* | 12/2018 | Takano ................ G02B 6/3882 |
| 2019/0064447 A1 | 2/2019 | Chang et al. |
| 2019/0204513 A1 | 7/2019 | Davidson et al. |
| 2019/0271816 A1* | 9/2019 | Wong .................. G02B 6/3869 |
| 2020/0096707 A1* | 3/2020 | Gniadek ............. G02B 6/3869 |
| 2021/0215890 A1* | 7/2021 | Chen .................... G02B 6/3825 |

(56) References Cited

U.S. PATENT DOCUMENTS

FOREIGN PATENT DOCUMENTS

| | | |
|---|---|---|
| CN | 201383588 Y | 1/2010 |
| CN | 202600189 U | 12/2013 |
| DE | 202006011910 U1 | 3/2007 |
| DE | 102006019335 U1 | 10/2007 |
| EP | 1074868 A1 | 7/2001 |
| EP | 1211537 A2 | 6/2002 |
| EP | 1245980 A1 | 10/2002 |
| EP | 1566674 A2 | 8/2005 |
| EP | 2105773 A1 | 9/2009 |
| GB | 2111240 A | 6/1983 |
| JP | 2000089059 | 3/2000 |
| JP | 2009229545 A | 10/2009 |
| JP | 2009276493 A | 11/2009 |
| TW | 200821653 A | 5/2008 |
| WO | 200179904 A2 | 10/2001 |
| WO | 2004027485 A1 | 4/2004 |
| WO | 2008112986 A1 | 9/2008 |
| WO | 2009135787 A1 | 11/2009 |
| WO | 2010024851 A2 | 3/2010 |
| WO | 2012136702 A1 | 10/2012 |
| WO | 2012162385 A1 | 11/2012 |
| WO | 2014028527 A1 | 2/2014 |
| WO | 2014182351 A1 | 11/2014 |
| WO | 2015191024 A1 | 12/2015 |
| WO | 2016019993 A1 | 2/2016 |
| WO | 2016148741 A1 | 9/2016 |

OTHER PUBLICATIONS

International Search Report and Written Opinion, Application No. PCT/US2019/013861, dated Apr. 8, 2019, pp. 15.
Fiber Optic Connectors Tutorial, 2018, pp. 20.
Fiber Optic Glossary, Feb. 29, 2016, pp. 93.
"Fiber Optic Interconnect Solutions, Tactical Fiber Optical Connectors, Cables and Termini" 2006, Glenair, Inc., Glendale, California, www.mps-electronics.de, pp. 232.
"Fiber Optic Products Catalog" Nov. 2007, Tyco Electronics Corporation, Harrisburg, Pennsylvania, www.ampnetconnect.com, pp. 204.
"Fiber Optic Connectors and Assemblies Catalog" 2009, Huber & Suhner Fiver Optics, Herisau, Switzerland, www.hubersuhner.com, pp. 104.
International Search Report and Written Opinion, Application No. PCT/US2019/041341, dated Oct. 2, 2019, pp. 16.
International Search Report and Written Opinion for PCT Application No. PCT/US2020/043224 dated Oct. 21, 2020.

* cited by examiner

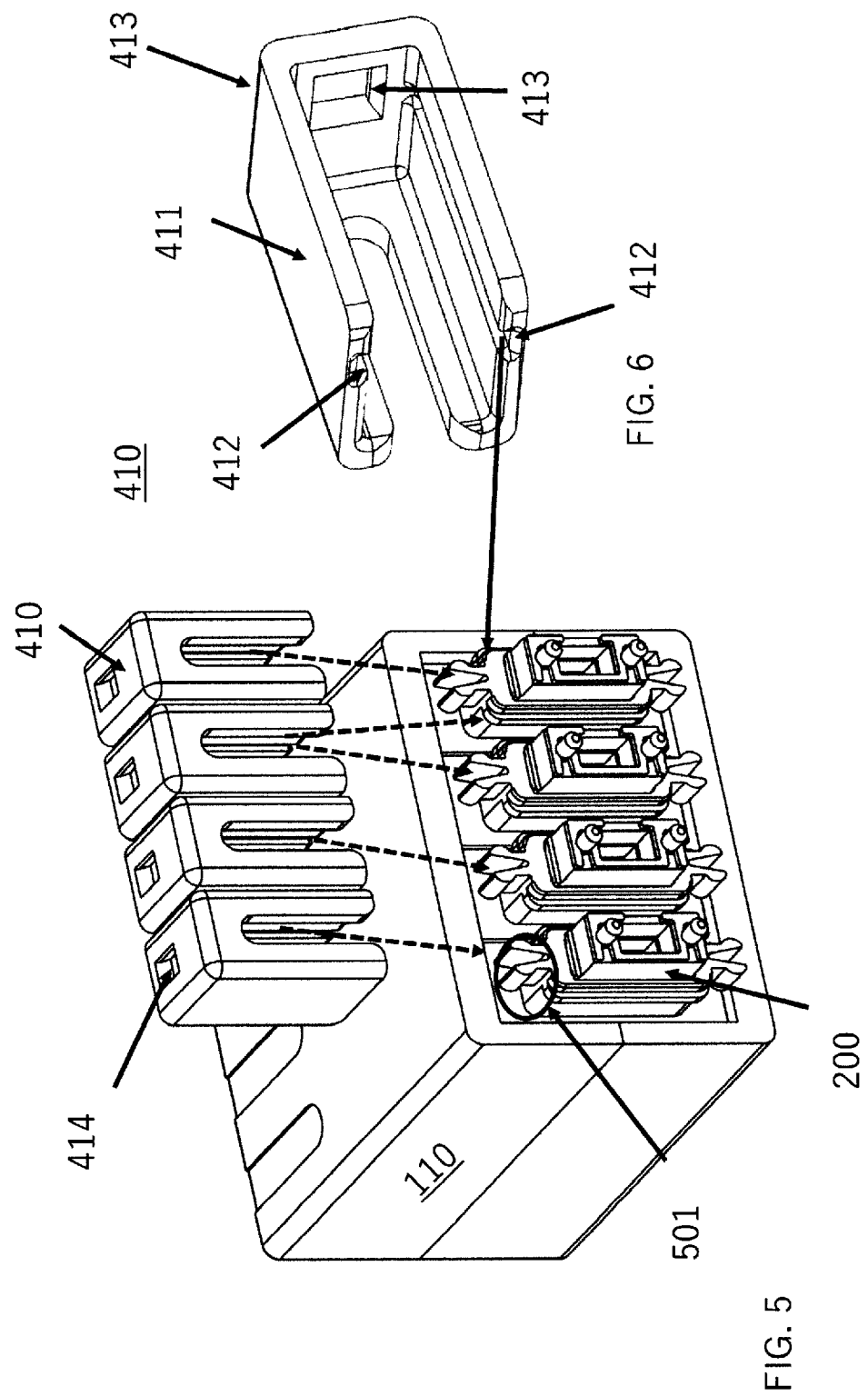

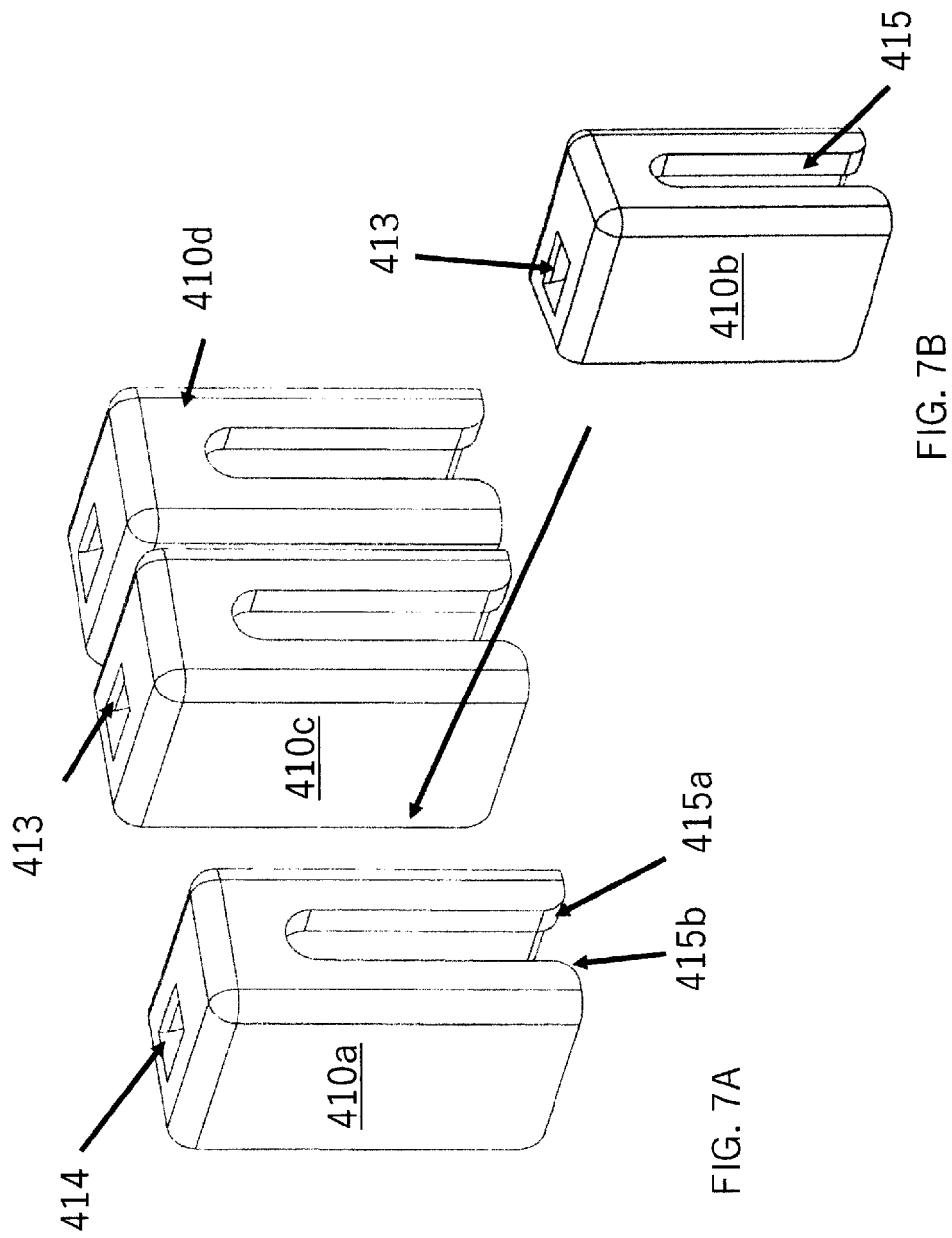

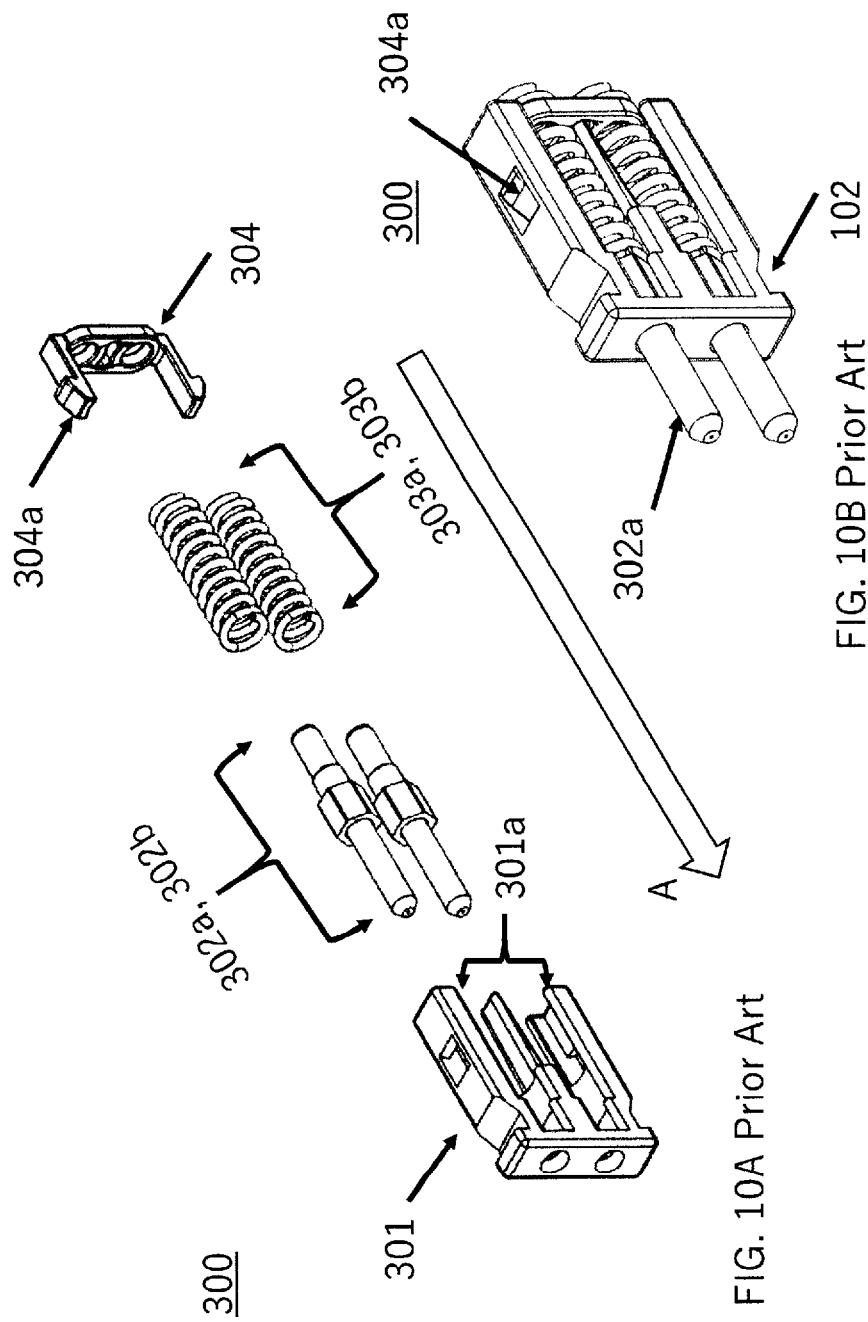

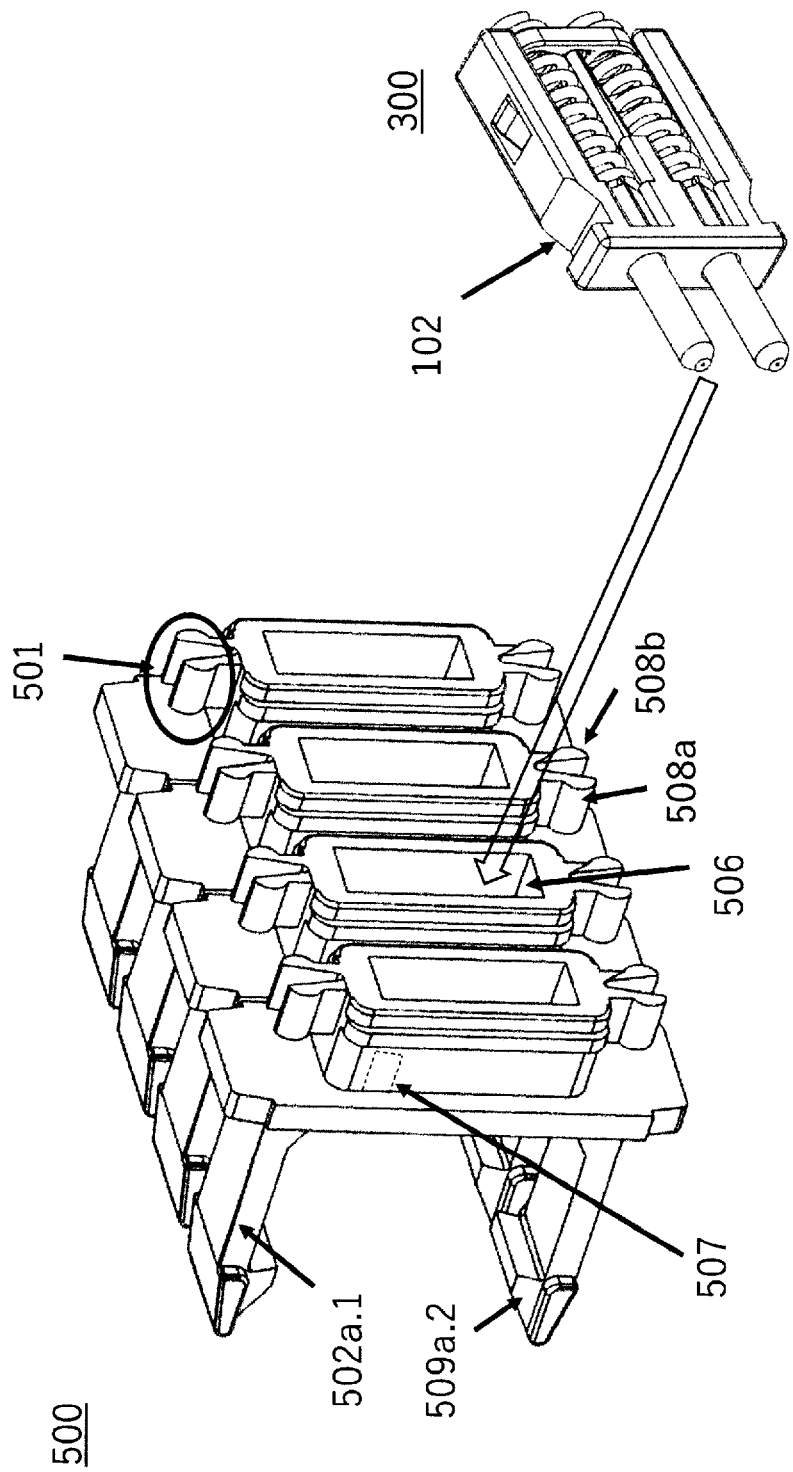
FIG. 10C.2 (Prior Art)
FIG. 10C.1

ULTRA-SMALL FORM FACTOR RECEPTACLE FOR RECEIVING A FIBER OPTIC CONNECTOR OPPOSING A FERRULE ASSEMBLY

CROSS REFERENCE TO RELATED APPLICATION

This Application claims priority to U.S. Provisional 62/877,708 titled "Micro Mechanical Transfer Ferrule Transceiver Assembly", filed Jul. 23, 2019, and claims priority to U.S. Provisional 62/878,133 filed on Jul. 24, 2019, title "Micro Mechanical Transfer Ferrule Transceiver Assembly", and both provisional applications are incorporated by reference herein.

FIELD OF THE INVENTION

The present disclosure relates generally to an ultra-small form factor receptacle for receiving opposing fiber optic connectors and ferrule assembly for use in a fiber optic adapter or optical transceiver.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

SUMMARY OF THE INVENTION

A receptacle with two opposing ports is configured to receive one or more fiber optic connectors in a first port, and is further configured to receive one or more ferrule assembly in a second port, the second port is opposite the first port, and when the opposing ports are populated, an optical pathway is formed between the opposing devices. An interconnect assembly is configured to be secured within a housing. The housing may be one piece or formed from an upper body and a lower body.

At a first end of the interconnect assembly is one or more latches formed from opposing latch arms. The opposing latch arms are received within a recess or a cut-out formed on an outer housing of a fiber optic connector to secure the fiber optic connector within a first port of the housing. A similar latch arm assembly is disclosed in U.S. Pat. No. 10,281,669 to Takano, titled "Ultra-Small Form Factor Optical Connectors", granted on May 7, 2019 to assignee of the present invention, which is fully incorporated herein by reference.

The first side or port of the receptacle further comprises opposing slots formed in the outer wall of the housing. The slots help ensure the fiber optic connector is inserted into the port at the first end, in the proper orientation by one or more exterior alignment keys on the fiber optic connector housing. The alignment keys fit within a corresponding slot, and ensure a first ferrule is oriented to transmit, Tx, and a second ferrule is oriented to receive, Rx. A similar orienting structure is found in pending U.S. patent application Ser. No. 16/194,325, filed on Nov. 17, 2018, titled "Ultra-Small Form Factor Optical Connector Having Dual Alignment Keys", and assigned to the assignee of the present invention and fully incorporated by reference herein.

The interconnect assembly further comprises a second end. The second end has one or more ports configured to accept a ferrule assembly. The ferrule assembly is typically formed of a ferrule, optical fiber therein, retaining pin, or back body and a bias spring. A similar behind-the-wall ferrule assembly is disclosed in pending patent application Ser. No. 16/877,384 filed on May 18, 2020, titled "Behind-The-Wall Optical Connector and Assembly of the Same", assigned to the assignee of the present invention and fully incorporated herein by reference. The ferrule assembly is releasably secured to the second end of the interconnect assembly with a stopper that receives a connector through an opening at one end of the stopper. The connector may be configured as opposing wings. The second end may also accept a mechanical transfer ferrule with a guide pin assembly in an adjacent port to the behind-the-wall ferrule assembly.

After one or more ferrule assembly are inserted into a port at the second end of the interconnect assembly, a stopper receives a catch or connector on the port of the interconnect assembly. The catch or connector may be formed from opposing wings that are deflected when receive in an opening of the stopper at a first end when the wings deflect inward upon passing through the opening. Each wing has a catch portion with a base portion defining a catch surface that engages with the stopper surface to resist sliding the stopper off the interconnect assembly thereby securing the one or more ferrule assembly within a respective port of the second end of the interconnector assembly, until the user removes the stopper.

BRIEF DESCRIPTION OF THE DRAWINGS

FIG. 5 is an exploded view of securing the stopper at a second end of the interconnect assembly;

FIG. 6 is a backside view of a stopper;

FIG. 7A is a perspective view of a plural of stopper;

FIG. 7B is a front view of the stopper;

FIG. 10A is an exploded view of a prior art second ferrule assembly;

FIG. 10B is an assembled view of the prior art second ferrule assembly, and.

FIG. 10C.1 and FIG. 10C.2 are a view of inserting the prior art second ferrule assembly into a port of the interconnect assembly at a second end.

Corresponding reference numbers indicate corresponding parts throughout the drawings.

DETAILED DESCRIPTION

The following terms shall have, for the purposes of this application, the respective meanings set forth below.

A connector, as used herein, refers to a device and/or components thereof that connects a first module or cable to a second module or cable. The connector may be configured for fiber optic transmission or light signal transmission. The connector may be any suitable type now known or later developed, such as, for example, a ferrule connector (FC), a fiber distributed data interface (FDDI) connector, an LC connector, a mechanical transfer (MT) connector, a square connector (SC) connector, a CS connector, or a straight tip (ST) connector. The connector may generally be defined by a connector housing body. In some embodiments, the housing body may incorporate any or all of the components described herein.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Receptacle herein is not limited to port, opening, or channel. A receptacle can accept and releasably retain connector (100) therein within a pair of opposing latch arms (refer to FIG. 10C.1). The receptacle may be one-piece, or two-piece as disclosed in FIG. 4.

Figure 1A:
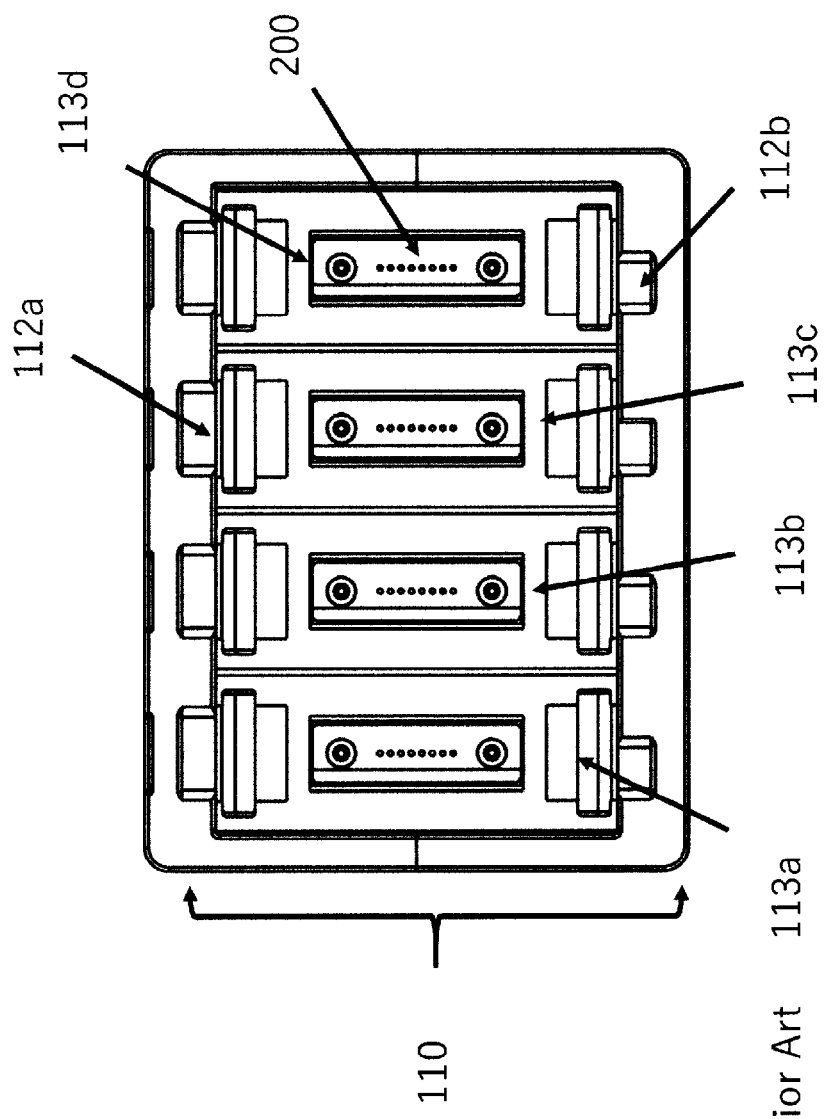
FIG. 1A is a front view of a prior art receptacle body with one or more ferrule assembly inserted at a second end and a latch arm assembly at the first end.
Figure 1B:
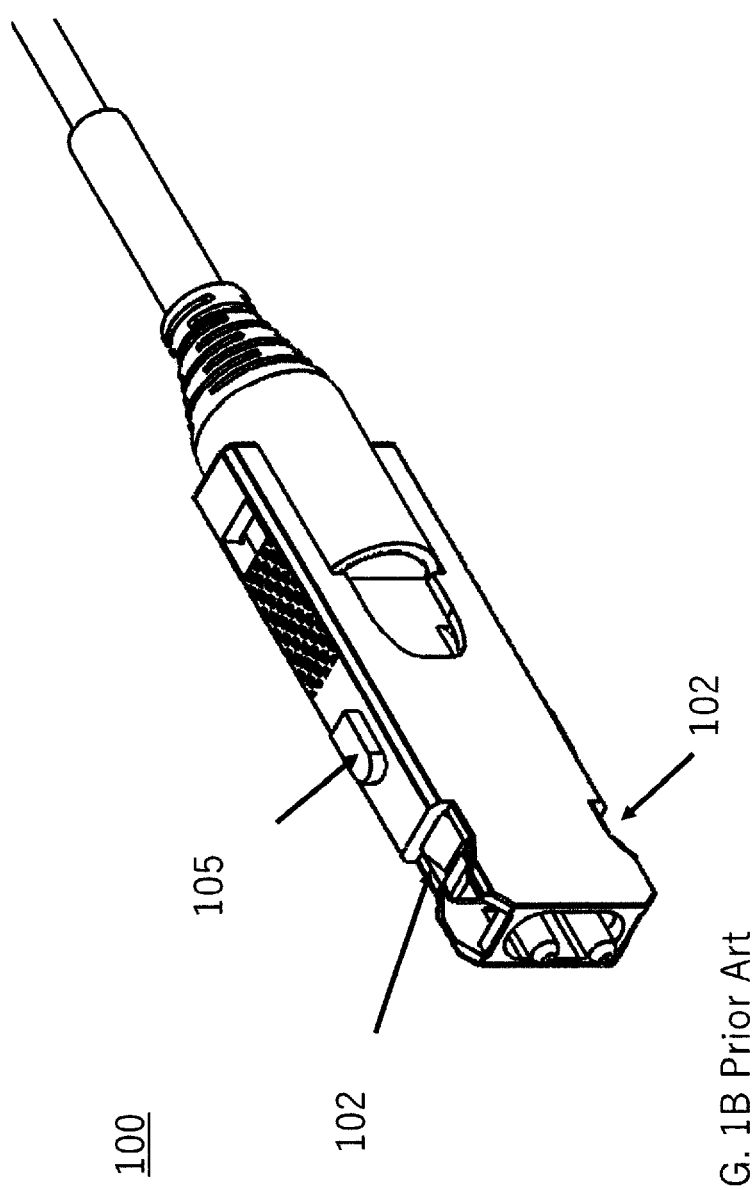
FIG. 1B depicts prior art fiber optic connectors.

FIG. 1A depicts a prior art receptacle housing (110) with opposing off-set alignment slots (112a, 112b) to accept alignment key (105) located on outer housing of fiber optic connector (100) (refer to FIG. 1B). Inserting connector (100) within port (113a-113d) at a first end of the receptacle housing sets the correct orientation of connector (100), so the connector can form an optical communication pathway with opposing ferrule assembly (200, 300) as referred in FIG. 4 and FIG. 10B respectively. Interconnect assembly (400) (refer to FIG. 4) is secured within housing of receptacle. Depicted at FIG. 1A is view from the first side illustrating one or more ferrule (200) assembly secured at a second end of the interconnect assembly (400). FIG. 1B depicts a prior art fiber optic connector (100). Outer housing has opposing recesses (102) that are secured by opposing latch arms (502a.1, 502a.2) when protrusion (509a.1, 509a.2) is received within corresponding recess (102) (refer to FIG. 8). Alignment key (105) on outer housing is accepted in upper slot (112a) or lower slot (112b) when inserted into port (113a-113d) at a first end of receptacle housing (110). Alignment key (105) ensures connector is oriented in proper polarity direction to form an optical communication pathway with opposing ferrule assembly (200, 300).

Figure 2:
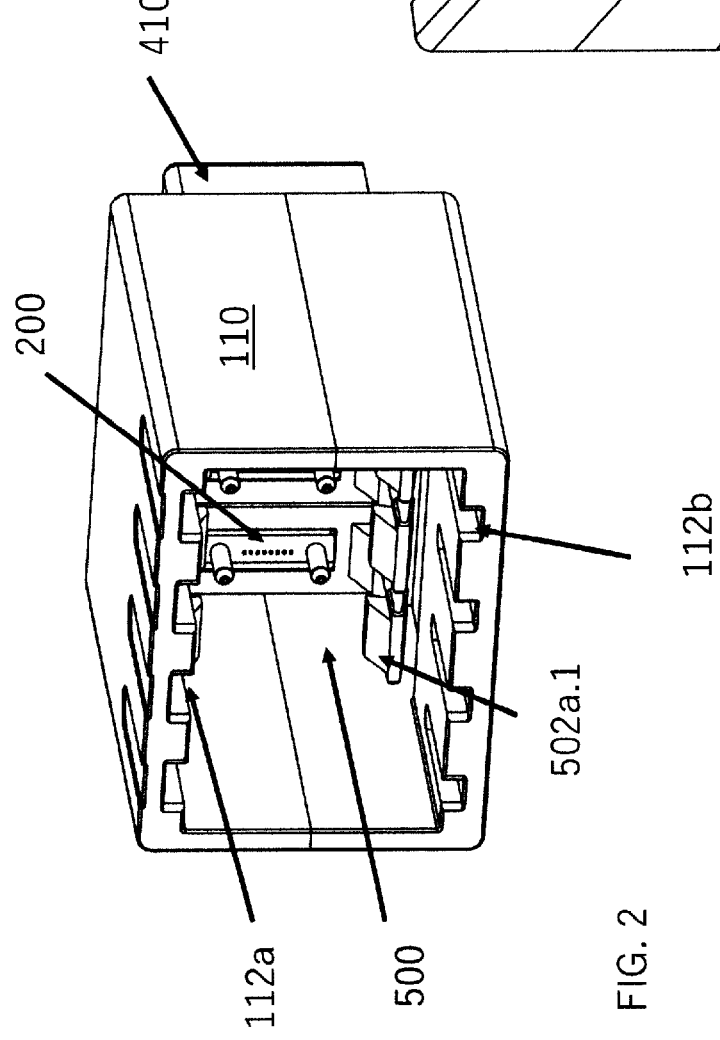
FIG. 2 is a front side perspective view of a receptacle body with opposing slots, and an interconnector assembly secure therein according to the present invention.
Figure 3:
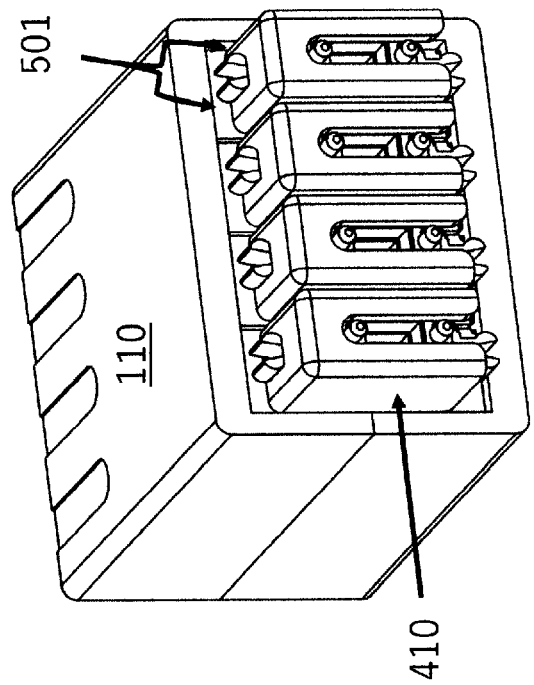
FIG. 3 is back side perspective view of one or more ferrule assembly secured within a port by a stopper.
Figure 8:
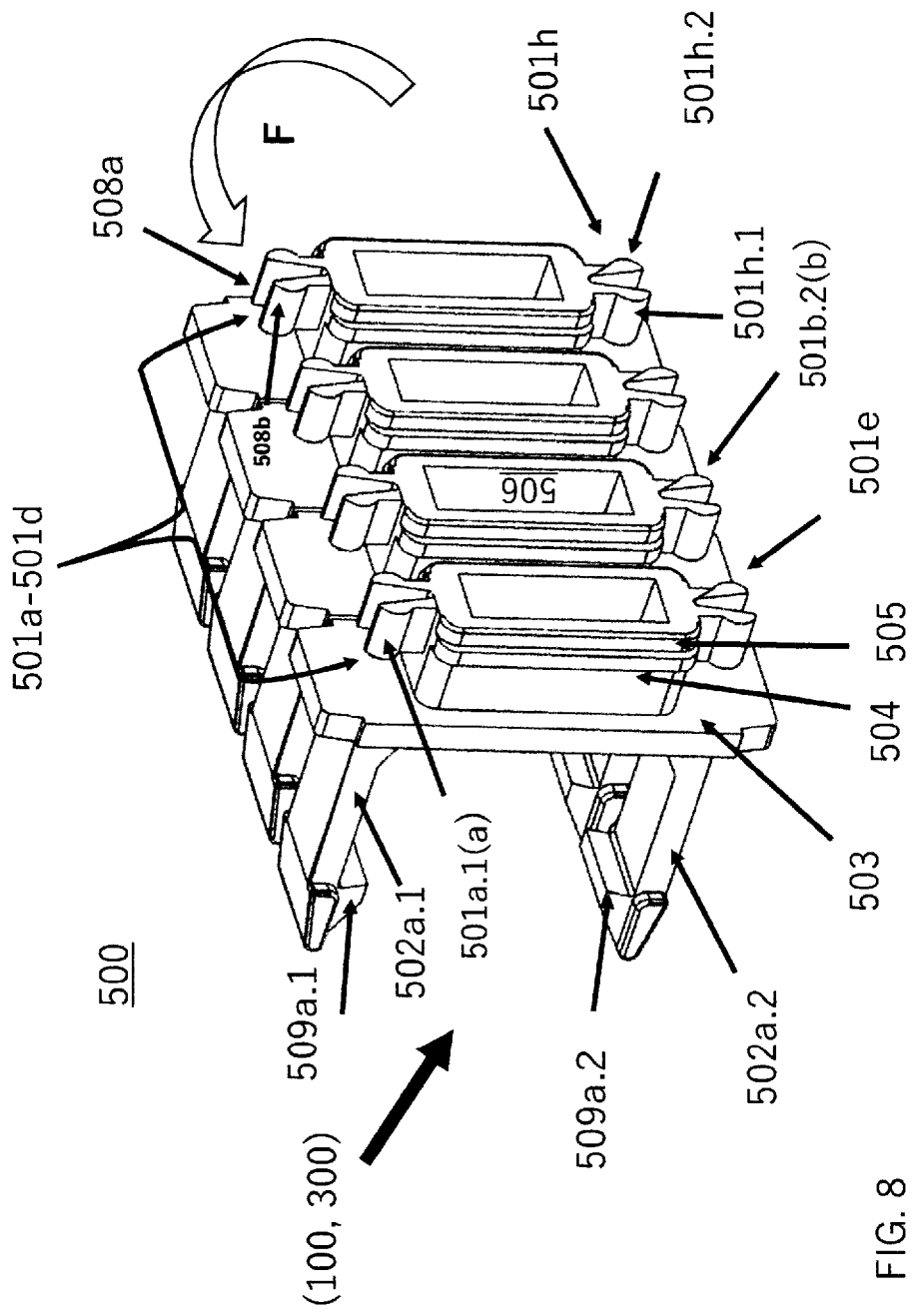
FIG. 8 is a perspective view of an interconnector assembly according to the present invention.

FIG. 2 depicts prior art receptacle outer housing (110) configured with interconnect assembly (500) (refer to FIG. 8). First end of assembly (500) further comprises one or more opposing latch arm (502a.1, 502a.2) and second end receives ferrule assembly (200, 300) secured with port (506) by corresponding stopper (410) (refer to FIG. 8 and FIG. 6). Fiber optic connector (100) is accepted into a port, in the correct orientation as determined by upper slot (112a) and lower slot (112b) accepting alignment key (105) as described in FIG. 1B above. FIG. 3 depicts a second end of interconnect assembly (500) with stopper (410) securing ferrule assembly (200, 300) within respective opening (506) or port (FIG. 8). Upon inserting stopper (410) about the ferrule assembly (200, 300), connector (501) is guided through connector opening (414) by opposing chamfer (413), as described in FIG. 5 and FIG. 6. Without departing from the scope of the invention, connector (501) may be opposing wings (508a, 508b) (refer to FIG. 8). Each wing has radius surface (501a.1(a), 501b.2(b)) to help prevent jamming with the stopper is secured about the ferrule assembly.

Figure 4:
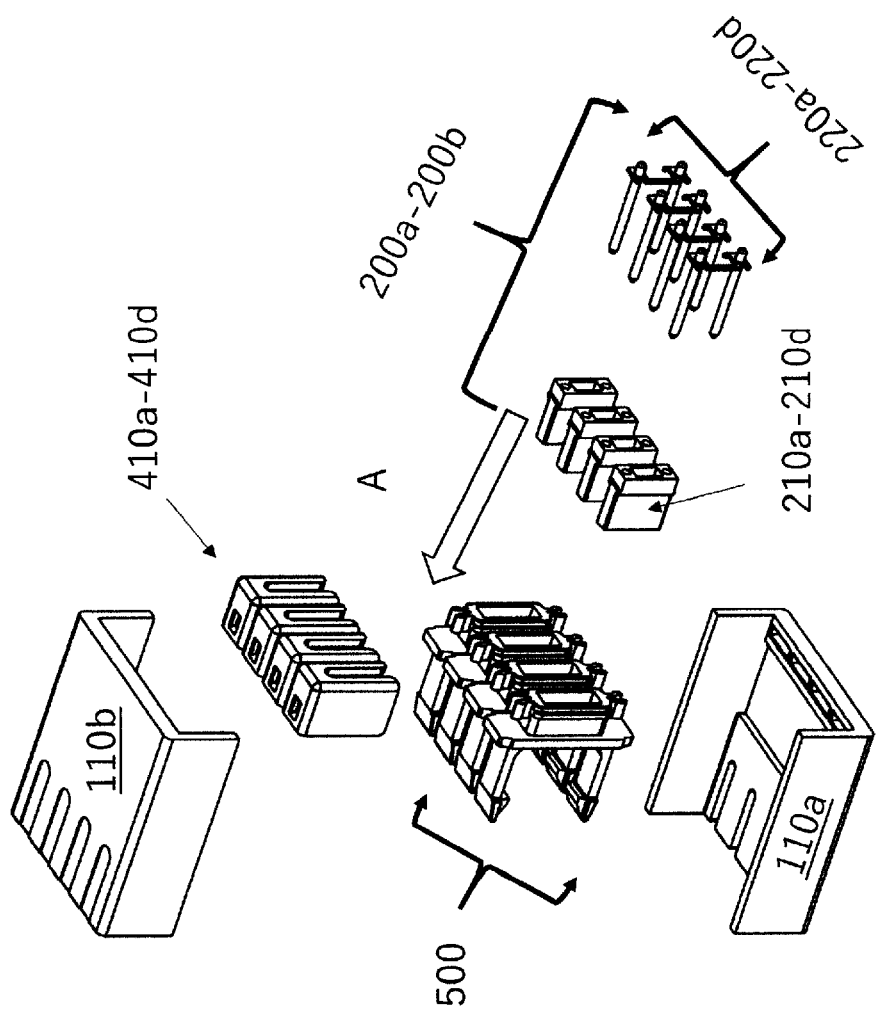
FIG. 4 is an exploded view of FIG. 3.

FIG. 4 depicts an exploded view of interconnect assembly (500) secured by outer receptacle housing formed by upper housing body (110b) and lower housing body (110a). Assembly of ferrule assembly (200, 300) is described in FIG. 4, in direction of arrow A, and FIG. 10C.1 and FIG. 10C.2 in direction of arrow A. Ferrule assembly (200a-200b) is formed from a mechanical transfer ferrule (210a-210d) (refer to FIG. 9) and guide pin assembly (220a-220d). After ferrule assembly is inserted in port (506), corresponding stopper (410a-410d) is secured with extended frame (505) of outer frame (504) formed as part of base (503) of assembly (500) (refer to FIG. 8).

FIG. 5 and FIG. 6 depict securing ferrule assembly (200) within port or opening (506) after assembly is inserted therein. FIG. 5 illustrates stopper (410) (refer to FIG. 6), inserted about ferrule assembly (200), and stopper (410) is configured to accept corresponding frame structure, as described at FIG. 5 herein. Connector (501) is received in stopper opening (414). Connector (501) deflects upon entering a first end of opening (414) when leading edge (501d.1, 501d.2) (refer FIG. 8) deflects inward when contacting corresponding chamfer (413) (refer to FIG. 6). Opposing slot (412) are configured to receive extended frame (505) to guide and mate stopper about ferrule assembly (200) to prevent jamming, and to help ensure connector (501) is aligned and received within opening (414). Without departing from scope of the invention, outer frame (504) may be extended removing extended frame (505), while opposing slot (412) are made wider (refer to FIG. 6). Referring to FIG. 6, stopper (410) is formed from a generally C-shaped main body (411), with slot or opening (415) sized to accept inner body (201) of ferrule assembly (200) (refer to FIG. 9). Opening (414) has opposing chamfers (413) to help ensure connector (501) does not jam when inserted into opening (414). Without departing from the scope of the invention, slot or opening (415) is sized to accept inner body (301) of ferrule assembly (300) (refer to FIG. 10A). The invention improves on similar prior art receptacles by reducing the overall dimension or size of the ferrule assembly by removing structure such as an outer housing, with the stopper and interconnect assembly providing the additional integrity or support when the assembled in a small footprint receptacle.

FIG. 7A and FIG. 7B depict stopper (410) and one or more stopper (410a-410d). Referring to elements in FIG. 7A, and as described in other figures in the present application, each stopper (410) has opening (414) with at least one chamfer (413) configured to accept connector (501) as described in the present application. FIG. 7A illustrates two or more stoppers (410) can be arranged side-by-side, as illustrated by FIG. 7B stopper (410b) being positioned with array of stoppers (410a, 410b-410d). Slot or opening (415) accepts extended frame (505) or outer frame (504) as described in the present application. A second set of chamfers (415a, 451b) engages extended frame (405) to prevent jamming when stopper (410) is secured about ferrule assembly (200, 300).

FIG. 8 depicts interconnect assembly (500). Interconnect assembly (500) comprises base (503). On first side of base (503) are one or more opposing latch arm (502a.1, 502a.2) with protrusion (509a.1, 509a.2) that function as catches received with recess (102) of ferrule assembly (300) or fiber optic connector (100). Without departing from the scope of the invention, instead of fiber optic connector (100) received within a port formed by opposing latch arms, ferrule assembly (300) (refer FIG. 10B) may be installed, and opposing a second ferrule assembly (300) secured with port or opening (506) as described in the present invention. On a second side of base (503) is formed outer frame (504) with extended frame (505). An opening (506) receives ferrule assembly (200, 300), which is secured in place with stopper (410) accepting corresponding connector (501a-501b). With departing from the scope of the invention, stopper (410) may secure ferrule assembly (200, 300) from an opposing side of frame by receiving connector (501e-501h) (described in FIG. 5 for opposing connector (501a-501d). Each connector (501) opposing wing (508a, 508b) further comprises chamfer surface (501a.1(a), 501b.2(b)), where the chamfer engages corresponding chamfer (413) as described in FIG. 7A. As connector (501) is inserted into opening (414), opposing wing (508a, 508b) flex inward (508a) as in direction of arrow F. Once stopped (410) is installed, as depicted in FIG. 3 and explained in FIG. 5, the wings flex outward to their original position acting as a friction fit and stop face preventing stopper (410) from being removed unless sufficient pull force is applied to overcome the spring force of the opposing wings.

Figure 9:
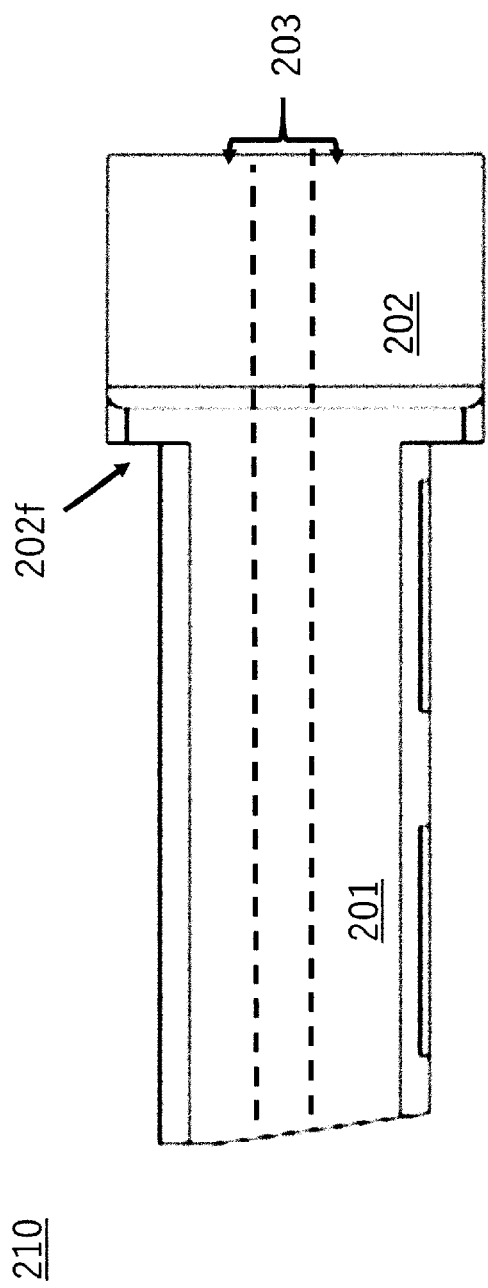
FIG. 9 is a side view of a ferrule.

FIG. 9 depicts ferrule (210) comprising inner body (201) and flange (202). One or more optical fibers (203) (depicted by dashed line) extend through the ferrule, and when fully inserted into port (506), ferrule assembly is in optical communication with fiber connector (100) or ferrule assembly (300) as determined by the user. Stop face (202f) prevents a user from pushing the ferrule (200) through the port (506), and when stopper (410) is secured as described herein, the stopper inner structure mates with frame structure (504,505) about ferrule assembly. Referring to FIG. 10c.1, stop face (507) may be formed within port (506) to likewise ensure ferrule assembly (300) is not over inserted in port (506), when contacting stop face (202f).

Referring to FIG. 10A and FIG. 10B assembly of prior art ferrule assembly (300) is described. Ferrule assembly (300) is sometimes called a behind-the-wall connector as described above. In FIG. 10A, backbody (304) is secured to inner body (301), with opposing recesses (102) (refer to FIG. 10B). Ferrule flange with ferrule and optical fiber therein (302a, 302b) is biased forward within inner body (301) by corresponding bias spring (303a, 303b). Inner body (301) has opposing open sidewall (301a) to further reduce overall ferrule assembly (300) dimensions. FIG. 10B depicts backbody latch (304a) received within corresponding opening of inner body forming assembled ferrule assembly (300).

FIG. 10C.1 and FIG. 10C.2 depicts inserting ferrule assembly (300) (refer to FIG. 10B into port (506) of interconnect assembly (500). Internal stop face (507) prevents a user from over inserting ferrule assembly (200, 300) in port (506).

In the above detailed description, reference is made to the accompanying drawings, which form a part hereof. In the drawings, similar symbols typically identify similar components, unless context dictates otherwise. For example, 113 generally refers to a port and 113as, 113b to a first or a second port, or one or more ports.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

What is claimed is:

1. A receptacle for receiving a fiber optic connector comprising:
   a housing having an opening for receiving the fiber optic connector;
   a ferrule assembly;
   an interconnect assembly attached to the housing, the interconnect assembly comprising a latch configured to connect with the fiber optic connector upon reception of the fiber optic connector into the opening in the housing, a ferrule assembly port receiving the ferrule assembly therein, a stopper slidably received onto the interconnector assembly in a position to capture the ferrule assembly in the ferrule assembly port, and a connector on the interconnect assembly releasably securing the stopper from sliding off of the interconnect assembly.

2. The receptacle as set forth in claim 1 wherein the housing is formed with a slot configured to receive the fiber optic connector only in an orientation that will produce an optical communication pathway with the ferrule assembly upon reception of the fiber optic connector in the housing.

3. The receptacle as set forth in claim 2 further comprising a guide channel formed into the housing, the guide channel being aligned with the ferrule assembly port in the interconnect assembly.

4. The receptacle as set forth in claim 1 wherein the housing is configured to accept plural fiber optic connectors.

5. The receptacle as set forth in claim 1 wherein the connector of the interconnect assembly comprises opposed wings secured on the interconnect assembly, the wings being configured for deflection by engagement with the stopper to releasably connect the stopper to the interconnect assembly.

6. The receptacle as set forth in claim 5 wherein the stopper comprises an opening having a perimeter, the wings being engageable with the stopper at the perimeter of the opening upon sliding the stop onto the interconnect assembly to resiliently deflect the wings inwardly toward one another to permit the wings to pass through the opening by deflecting the wings toward one another.

7. The receptacle as set forth in claim 6 wherein the stopper comprises an engagement surface and each wing comprises a base portion attached to the interconnector assembly and a catch portion, the catch portion being enlarged relative to the base portion and defining a catch surface engageable with the engagement surface of the stopper to resist sliding movement of the stopper off of the interconnect assembly.

* * * * *